US008611529B2

United States Patent
Chen et al.

(10) Patent No.: US 8,611,529 B2
(45) Date of Patent: Dec. 17, 2013

(54) COMMUNICATION DEVICE (75) Inventors: Xingjing Chen, Aichi (JP); Yasunori Watanabe, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 153 days.

(21) Appl. No.: 13/359,677

(22) Filed: Jan. 27, 2012

(65) Prior Publication Data
US 2012/0201371 A1    Aug. 9, 2012

(30) Foreign Application Priority Data

Feb. 8, 2011 (JP) ................. 2011-024759

(51) Int. Cl.
*H04M 1/04* (2006.01)
*H04N 1/00* (2006.01)
*H04M 1/21* (2006.01)

(52) U.S. Cl.
CPC ....... *H04N 1/00559* (2013.01); *H04N 1/00554* (2013.01); *H04N 1/00* (2013.01); *H04N 1/2535* (2013.01); *H04M 1/21* (2013.01)
USPC ....... 379/434; 379/100.01; 379/446; 358/400

(58) Field of Classification Search
USPC ............... 379/100.01–100.03, 434, 446, 447, 379/449, 455; 358/1.1, 1.15, 400
See application file for complete search history.

(56) References Cited

U.S. PATENT DOCUMENTS

| 2006/0013386 A1* | 1/2006 | Ishida et al. | 379/449 |
| 2007/0127079 A1* | 6/2007 | Iwata et al. | 358/400 |
| 2009/0153903 A1* | 6/2009 | Kunii et al. | 358/1.16 |
| 2009/0168115 A1* | 7/2009 | Kunii | 358/444 |

FOREIGN PATENT DOCUMENTS

| JP | 01-319349 | 12/1989 |
| JP | 04-023350 | 2/1992 |
| JP | 03-239919 | 12/2001 |

* cited by examiner

*Primary Examiner* — Tuan D Nguyen
(74) *Attorney, Agent, or Firm* — Banner & Witcoff, Ltd.

(57) ABSTRACT

A communication device is provided, which includes a communication unit performing data communication, a communication device main body accommodating the communication unit, a handset that is electrically connected with the communication unit and configured to be used for voice communication, a first side cover forming a first side wall of the communication device main body in a predetermined width direction of the communication device main body, an upper cover that is disposed over the first side cover and configured with a higher stiffness than the first side cover, a holder that is attached to the first side cover and configured to hold the handset on an upper surface of the holder, and a load transmission unit transmitting, to the upper cover, a load applied upward from a lower surface of the holder.

9 Claims, 9 Drawing Sheets

COMMUNICATION DEVICE

CROSS-REFERENCE TO RELATED APPLICATION

This application claims priority under 35 U.S.C. §119 from Japanese Patent Application No. 2011-024759 filed on Feb. 8, 2011. The entire subject matter of the application is incorporated herein by reference.

BACKGROUND

1. Technical Field

The following description relates to one or more communication devices.

2. Related Art

A communication device has been known, which includes a main body that accommodates a communication unit configured to perform data communication, a handset that is electrically connected with the communication unit and used for voice communication, a side cover that forms one of side walls in a width direction of the main body, and a holder that is attached to the side cover and configured to hold the handset on an upper surface of the holder.

The holder includes a locking portion formed at the lower end thereof. The side cover includes a rib portion that is formed at a region to which the holder is attached.

When the locking portion is engaged with the rib portion, the holder is positioned relative to the side cover and tightly attached to the side cover by one or more screws.

SUMMARY

However, the known communication device has a problem that it is difficult to improve mechanical durability of a structure for attaching the holder configured to hold the handset.

Specifically, when a user puts his/her hand on a lower surface of the holder to lift the communication device, a load is applied upward from the lower surface of the holder. Hence, the upward load applied to the holder is transmitted to the side cover. Thereby, a joint portion between the side cover and the holder might excessively be deformed. More specifically, the upward load makes the holder turn upward around a screw-clamped portion. Then, the side cover is locally pressed by an upper end of the holder, so as to be deformed. Consequently, the communication device might be damaged with the side cover or the holder.

Aspects of the present invention are advantageous to provide one or more improved communication devices that make it possible to improve mechanical durability of a structure for attaching a holder configure to hold a handset.

According to aspects of the present invention, a communication device is provided, which includes a communication unit configured to perform data communication, a communication device main body that accommodates the communication unit, a handset electrically connected with the communication unit, the handset being configured to be used for voice communication, a first side cover configured to form a first side wall of the communication device main body in a predetermined width direction of the communication device main body, an upper cover disposed over the first side cover, the upper cover being configured with a higher stiffness than the first side cover, a holder attached to the first side cover, the holder being configured to hold the handset on an upper surface of the holder, and a load transmission unit configured to transmit, to the upper cover, a load applied upward from a lower surface of the holder.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

(Embodiment)

Figure 1:
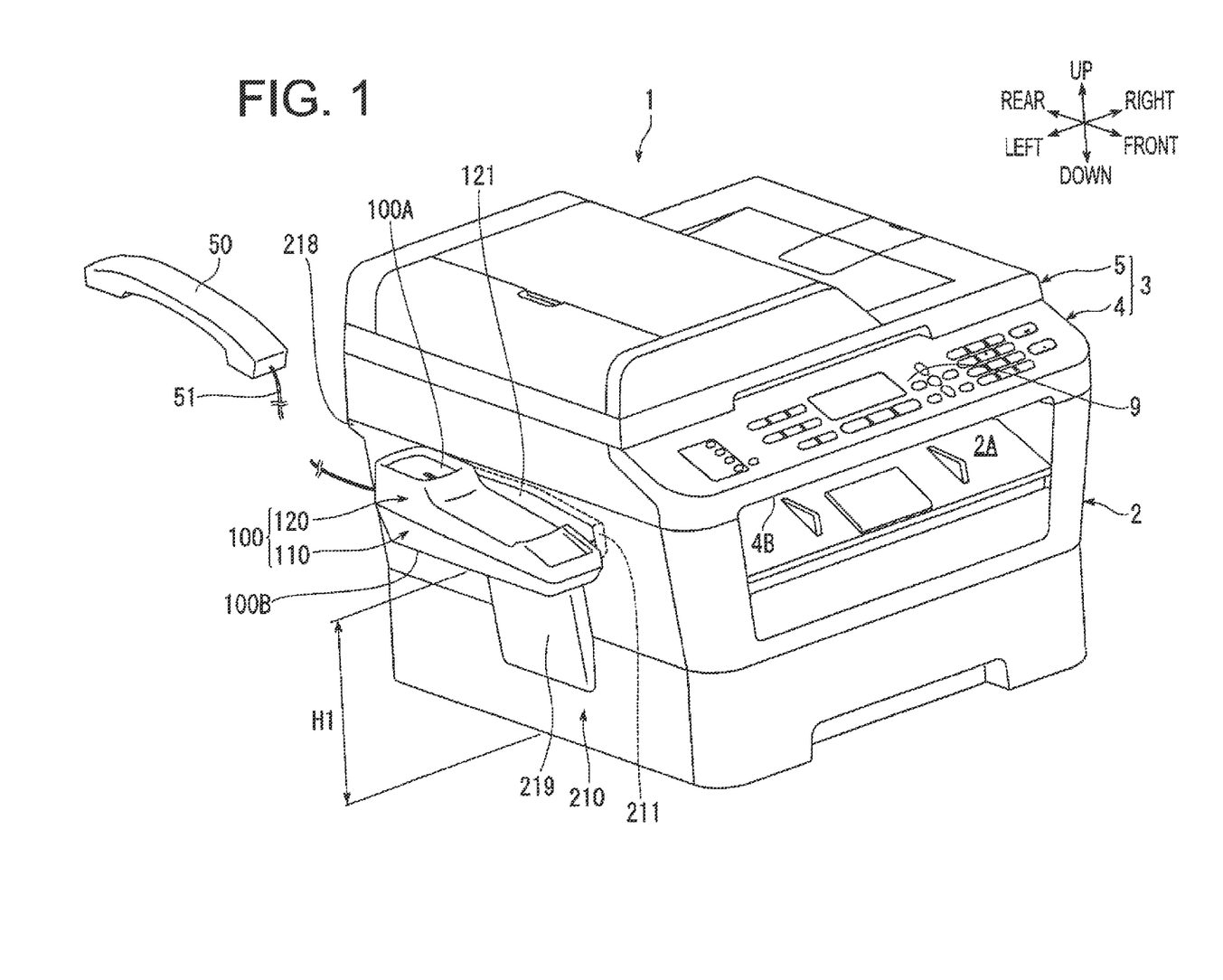
FIG. 1 is a perspective view of a communication device in an embodiment according to one or more aspects of the present invention.

As shown in FIG. 1, a communication device 1 of an embodiment is a multi-function peripheral configured to perform a plurality of operations such as a communication operation, an image forming operation, and an image reading operation. It is noted that, in the following descriptions, the front, rear, left, and right sides of the communication device 1 will be defined as shown in the accompanying drawings.

<Overall Configuration>

Figure 2:
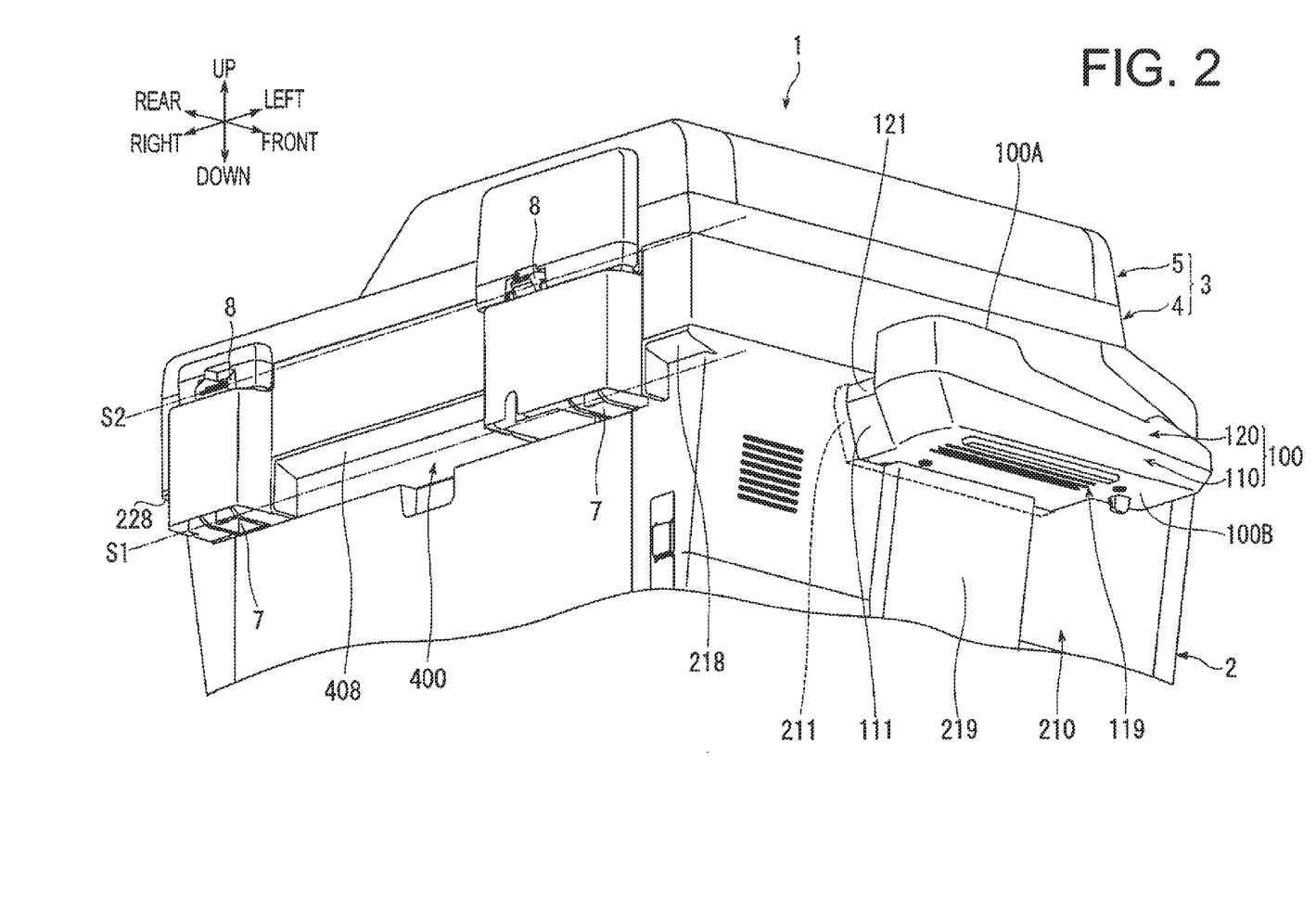
FIG. 2 is a perspective view partially showing the communication device in the embodiment according to one or more aspects of the present invention.
Figure 3:
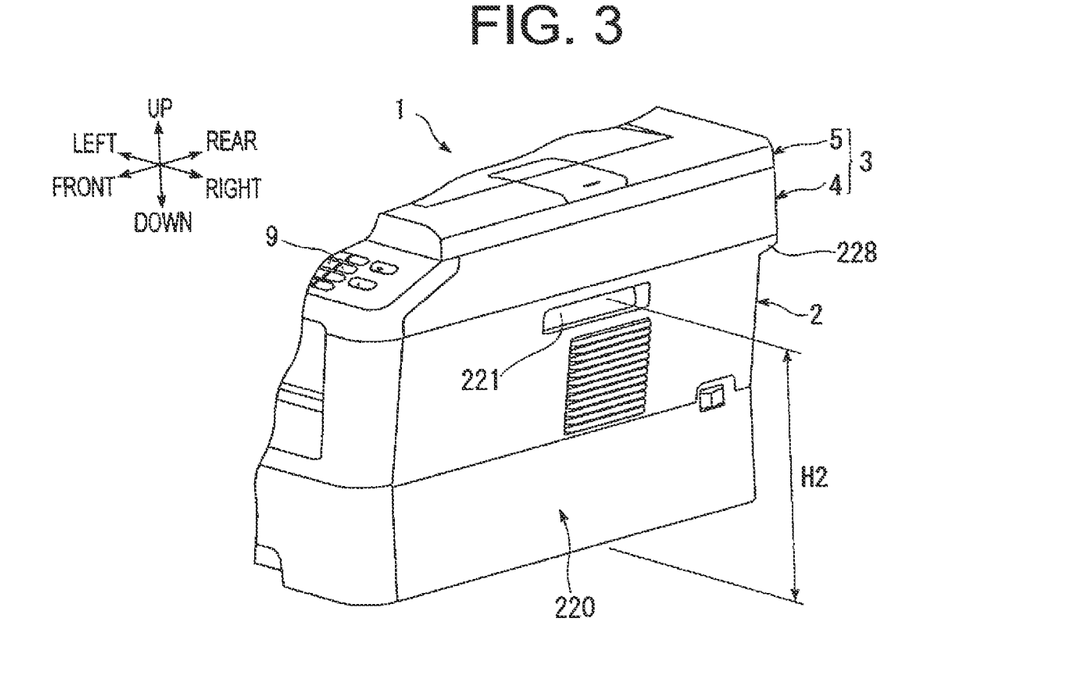
FIG. 3 is a perspective view partially showing the communication device in the embodiment according to one or more aspects of the present invention.

As shown in FIGS. 1 to 3, the communication device 1 includes a communication device main body 2 and a reading unit 3 disposed over the communication device main body 2. The reading unit 3 includes a reading unit main body 4 and an opening-closing portion 5 disposed over the reading unit main body 4. The communication device main body 2, the reading unit main body 4, and the opening-closing portion 5 are substantially box-shaped bodies having frame members (not shown), respectively.

Figure 4:
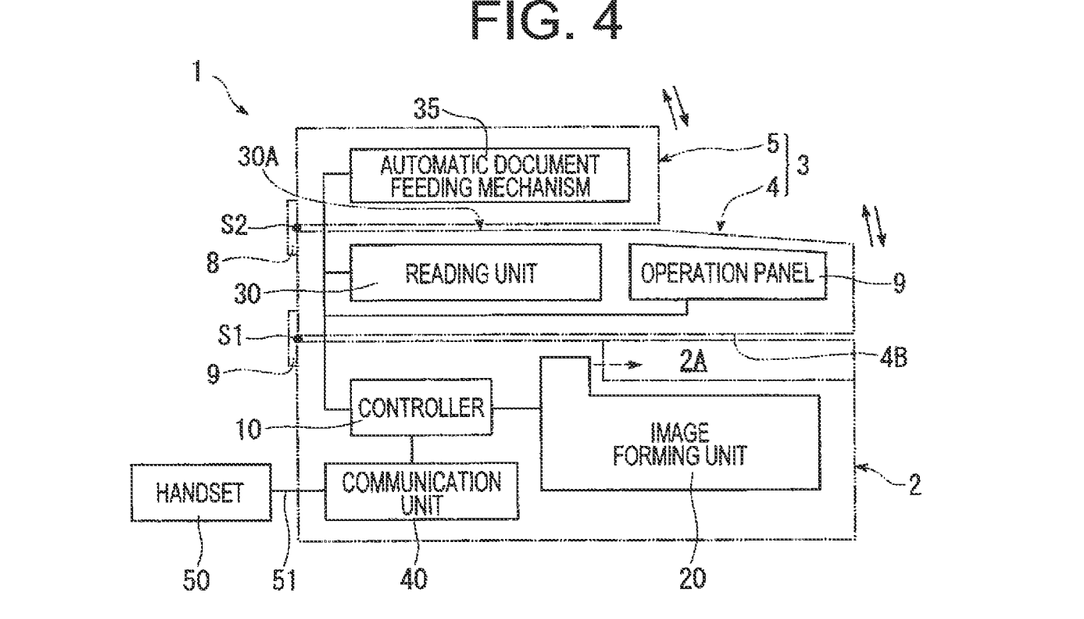
FIG. 4 schematically shows a configuration of the communication device with major elements included therein in the embodiment according to one or more aspects of the present invention.
Figure 5A:
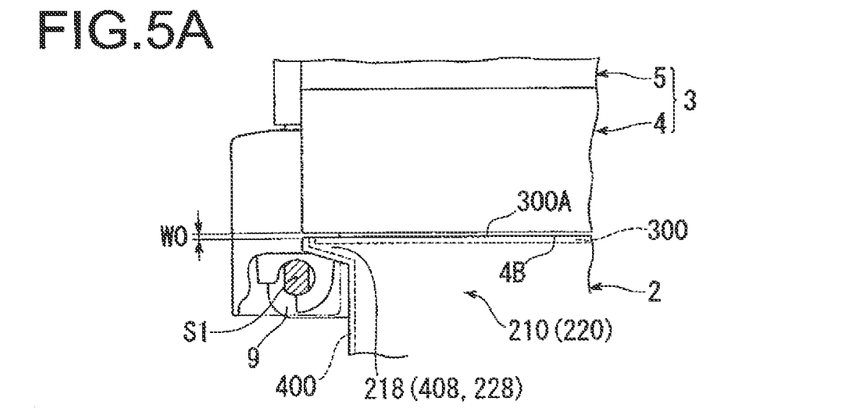
FIG. 5A is a side view partially showing a reading unit in a contact position in the embodiment according to one or more aspects of the present invention.
Figure 5B:
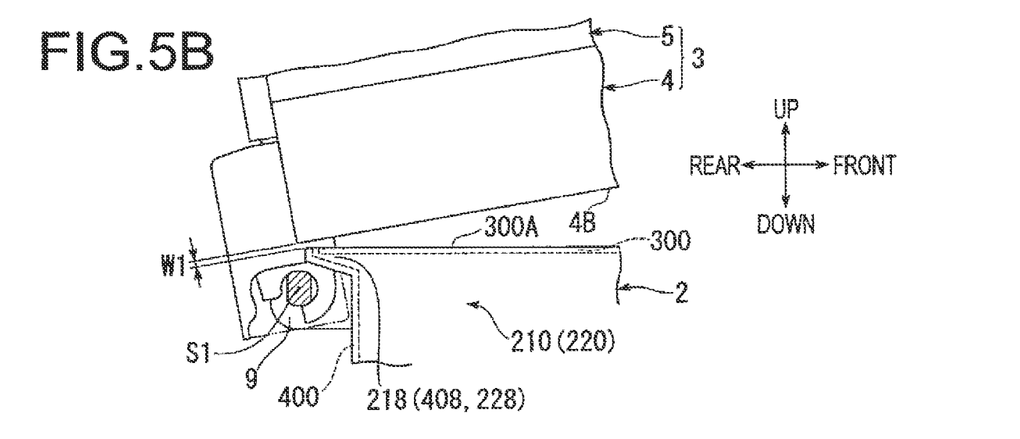
FIG. 5B is a side view partially showing the reading unit in a separate position in the embodiment according to one or more aspects of the present invention.

As shown in FIGS. 2 and 4, the reading unit main body 4 is connected with the communication device main body 2 via two hinges 7, which are disposed at a left side and a right side on a rear face side of the communication device 1, respectively. Owing to the two hinges 7, the reading unit main body 4 is swingable around a swing center axis S1 extending in a width direction of the communication device 1 (i.e., in the left-to-right direction) on the rear face side of the communication device 1. FIGS. 1 to 3 and 5A show a state (hereinafter referred to as a "contact position") where the reading unit main body 4 contacts an upper surface of the communication device main body 2. When the reading unit main body 4 is in the contact position, a lower surface 4B of the reading unit main body 4 contacts a projection 310 of an upper cover 300 that will be described below with reference to FIGS. 6 and 10. Meanwhile, FIG. 5B shows a state (hereinafter referred to as a "separate position") where the reading unit main body 4 swings around the swing center axis S1 to an upper position separate from the communication device main body 2.

As shown in FIGS. 2 and 4, the opening-closing portion 5 is connected with the reading unit main body 4 via two hinges 8, which are disposed at the left side and the right side on the rear face side of the communication device 1, respectively. Owing to the two hinges 8, the opening-closing portion 5 is swingable around a swing center axis S2 extending in the left-to-right direction on the rear face side of the communication device 1. FIGS. 1 to 3 and 5A show a state where the opening-closing portion 5 covers the upper surface of the communication device main body 2. When the opening-closing portion 5 swings around the swing center axis S2 to an upper position separate from the reading unit main body 4, a document table surface 30A shown in FIG. 4 is uncovered (it is noted that such a state is not shown in any drawing).

As shown in FIG. 4, the communication device main body 2 accommodates a controller 10, an image forming unit 20, and a communication unit 40. The reading unit main body 4 includes a reading unit 30 and an operation panel 9. The opening-closing portion 5 accommodates an automatic document feeding mechanism 35.

As shown in FIGS. 1 and 4, there is a handset 50 provided at the left side of the communication device main body 2. The handset 50 is electrically connected with the communication unit 40 via a cord 51.

As shown in FIG. 1, the operation panel 9 includes operation keys and a display screen that are exposed on an upper front face side of the reading unit main body 4. The operation panel 9 is configured to accept user inputs via the operation keys, transmit the user inputs to the controller 10, and display information from the controller 10 on the display screen.

As shown in FIG. 4, the image forming unit 20 is configured in a known manner based on an electrophotographic method or an inkjet method. The image forming unit 20 is controlled by the controller 10 to perform an image forming operation of forming an image on a recording sheet such as a paper and a transparency.

As shown in FIGS. 1 and 4, the communication device main body 2 includes an ejection space 2A, which is recessed substantially horizontally inward from the front face of the communication device main body 2. The ejection space 2A is configured such that a sheet with an image formed by the image forming unit 20 is ejected thereto. The lower surface 4B of the reading unit main body 4 forms an upper inner-wall surface of the ejection space 2A. When a small size of sheet is ejected to the ejection space 2A, the user is allowed to easily take the sheet out of the ejection space 2A by turning the reading unit main body 4 to the separate position (see FIG. 5B) so as to open the upside of the ejection space 2A.

As shown in FIG. 4, the reading unit 30 is a flatbed type reader with an image reading sensor (not shown) disposed below the document table surface 30A. When the user does not utilize the automatic document feeding mechanism 35, the user turns the opening-closing portion 5 upward to render the document table surface 30A uncovered, and places a document sheet on the document table surface 30A. In this state, the controller 10 controls the reading unit 30 to move the image reading sensor relative to the document sheet on the document table surface 30A and perform a single operation of reading the document sheet.

Meanwhile, when the user utilizes the automatic document feeding mechanism 35, the user turns the opening-closing portion 5 downward to cover the document table surface 30A and sets a plurality of document sheets on the automatic document feeding mechanism 35. After controlling the reading unit 30 to move the image reading sensor to a predetermined reading position, the controller 10 controls the automatic document feeding mechanism 35 to feed the plurality of document sheets on a sheet-by-sheet basis and make the document sheets sequentially pass over the image reading sensor in the predetermined reading position. Further, the controller 10 controls the reading unit 30 to continuously read images of the plurality of document sheets sequentially passing over the image reading sensor.

The communication unit 40 is configured in a known manner to perform data communication with other communication devices connected with a telephone line or the Internet. The user is allowed to perform voice communication with another user who is using another communication device, by utilizing the handset 50 connected with the communication unit 40.

The communication device main body 2 includes a first side cover 210 (see FIGS. 1, 2, and 6 to 8) that forms a left-side wall of the communication device main body 2, a second side cover 220 (see FIG. 3) that faces the first side cover 210 and forms a right-side wall of the communication device main body 2, an upper cover 300 (see FIGS. 6 and 8) that forms the upper surface of the communication device main body 2, and a rear cover 400 (see FIG. 2) that forms a rear surface of the communication device main body 2.

Figure 6:
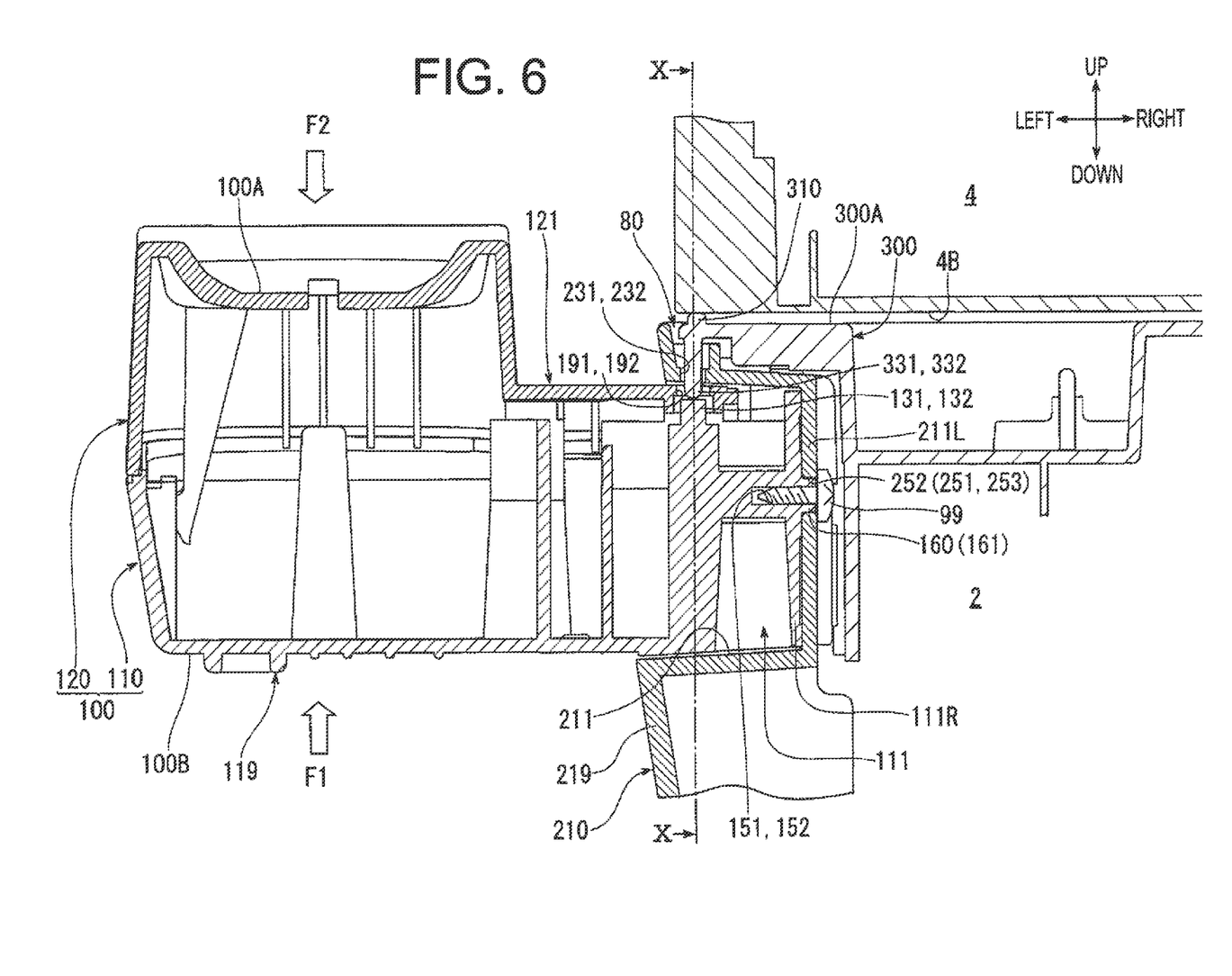
FIG. 6 is an enlarged cross-sectional front view showing a relative relationship among a holder, a first side cover, an upper cover, and a reading unit of the communication device in the embodiment according to one or more aspects of the present invention.
Figure 8:
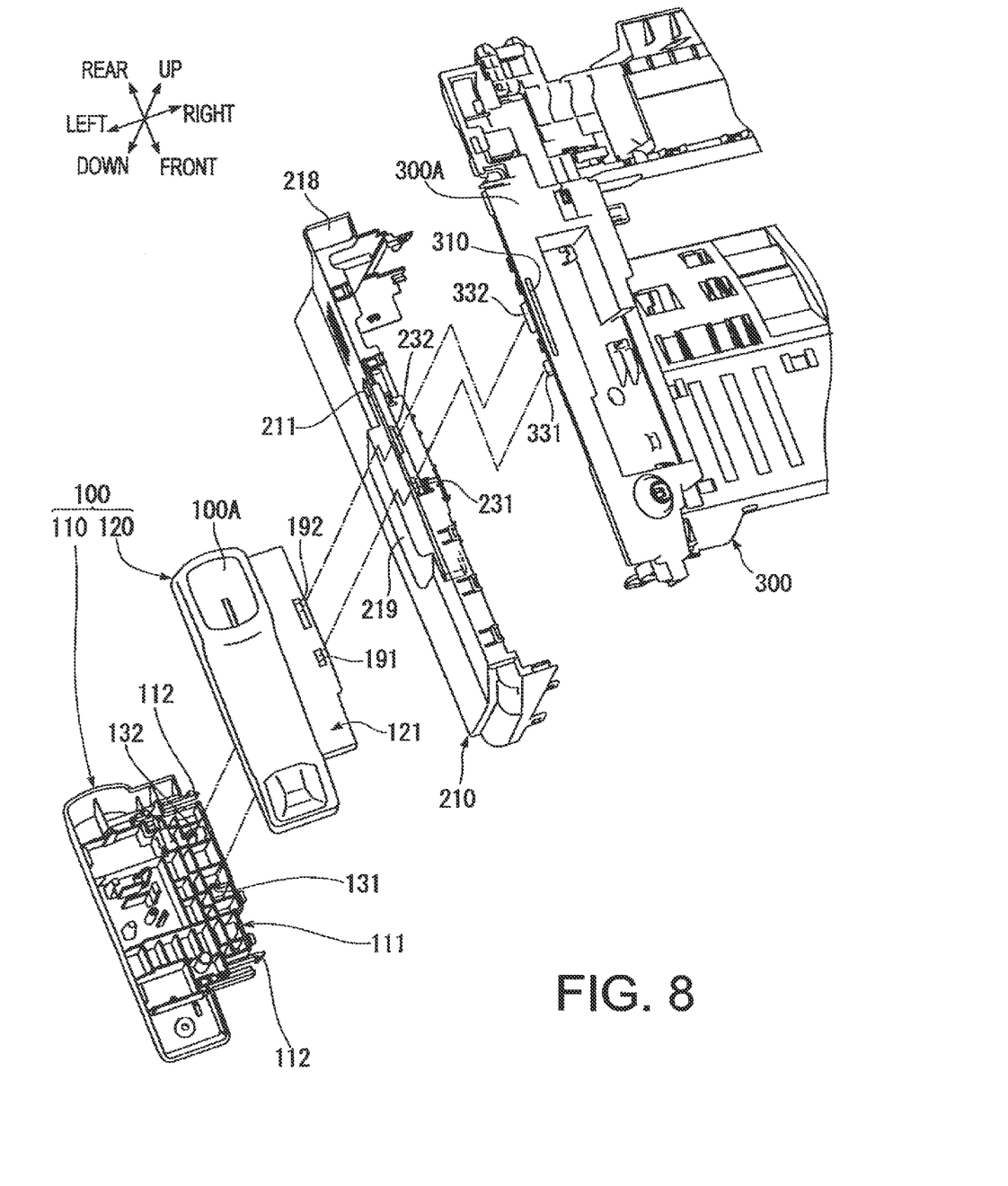
FIG. 8 is an exploded perspective view showing the holder, the first side cover, and the upper cover of the communication device in the embodiment according to one or more aspects of the present invention.

The first side cover 210, the second side cover 220, the upper cover 300, and the rear cover 400 are substantially flat-plate-shaped members formed from injection-molded thermoplastic resin. The communication device main body 2 includes a frame member (not shown) that supports the controller 10, the image forming unit 20, and the communication unit 40. The first side cover 210, the second side cover 220, the upper cover 300, and the rear cover 400 are fixed to the frame member from the outside. As shown in FIG. 6, a left end of the upper cover 300 is coupled with an upper end of the first side cover 210. Further, a right end of the upper cover 300 is coupled with an upper end of the second side cover 220, and a rear end of the upper cover 300 is coupled with an upper end of the rear cover 400 (it is noted that these features are not shown). As shown in FIG. 8, since the upper cover 300 includes reinforcing ribs and thick portions, the upper cover 300 has a higher stiffness than the first side cover 210.

As shown in FIGS. 1 and 2, a shielding portion 218 is formed at an upper rear end of the first side cover 210. As shown in FIG. 5A, the shielding portion 218 is formed in a wedge shape that protrudes tapered toward the rear side, when viewed along the left-to-right direction. An upper surface of the shielding portion 218 extends rearward in the horizontal direction to be continuous with the upper surface 300A of the upper cover 300. A rear end of the shielding portion 218 is placed above the swing center axis S1. A rear end of the lower surface 4B of the reading unit main body 4 is placed above the swing center axis S1.

As shown in FIG. 3, a shielding portion 228 that protrudes rearward is formed at an upper rear end of the second side cover 220. As shown in FIG. 2, a shielding portion 408 that protrudes rearward is formed at an upper rear end of the rear cover 400. As shown in FIG. 5A, the shielding portions 228 and 408 are formed in the same shape as the shielding portion 218, when viewed along the left-to-right direction. In this case, a gap W0 between a rear end of the lower surface 4B of the reading unit main body 4 and rear ends of the shielding portions 218, 228, and 408 is so narrow that a foreign substance or a finger is hardly stuck therebetween.

Figure 5C:
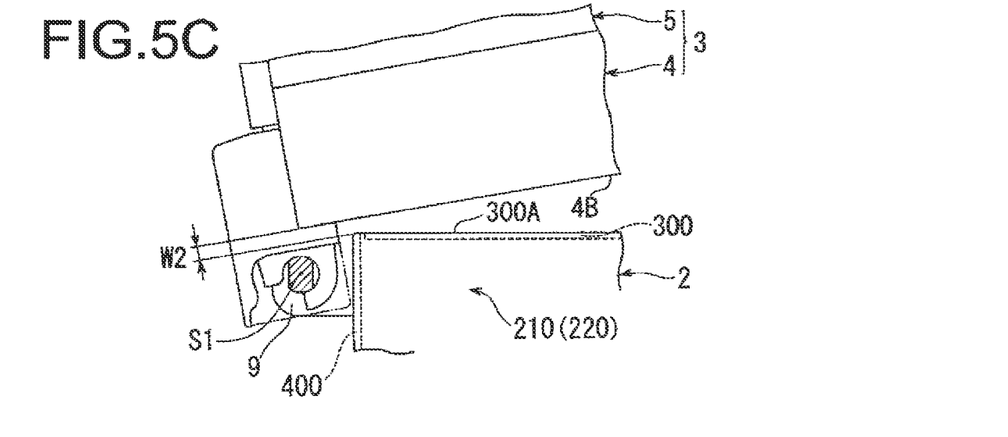
FIG. 5C is a side view partially showing the reading unit without any shielding portion in the contact position in a comparative example according to one or more aspects of the present invention.

Even when the reading unit main body 4 is turned to the separate position shown in FIG. 5B, a gap W1 between the rear end of the lower surface 4B of the reading unit main body 4 and the rear ends of the shielding portions 218, 228, and 408 is almost as narrow as the gap W0. FIG. 5C shows a comparative example based on the premise that there is not provided any shielding portion 218, 228, or 408. In this case, a gap W2 between the rear end of the lower surface 4B of the reading unit main body 4 and the rear end of the communication device main body 2 becomes wider than the gap W0, such that a foreign substance or a finger might easily be stuck therebetween. Thus, according to the communication device 1 of the embodiment, the shielding portions 218, 228, and 408 protruding rearward make it hard for a foreign substance or a finger to be stuck between the rear end of the lower surface 4B of the reading unit main body 4 and the rear end of the communication device main body 2, even when the reading unit main body 4 swings to the separate position.

<Holder>

As shown in FIGS. 1, 2, 6, and 7, the communication device 1 includes a holder 100 configured to hold the handset 50. The holder 100 is attached to the first side cover 210, so as to protrude outward from the left side of the communication device 1. A structure for attaching the holder 100 to the first side cover 210 will be described in detail later. As shown in FIGS. 6 and 8, the holder 100 includes a holder main body 110 and a holder upper body 120 attached to an upside of the holder main body 110.

Figure 9:
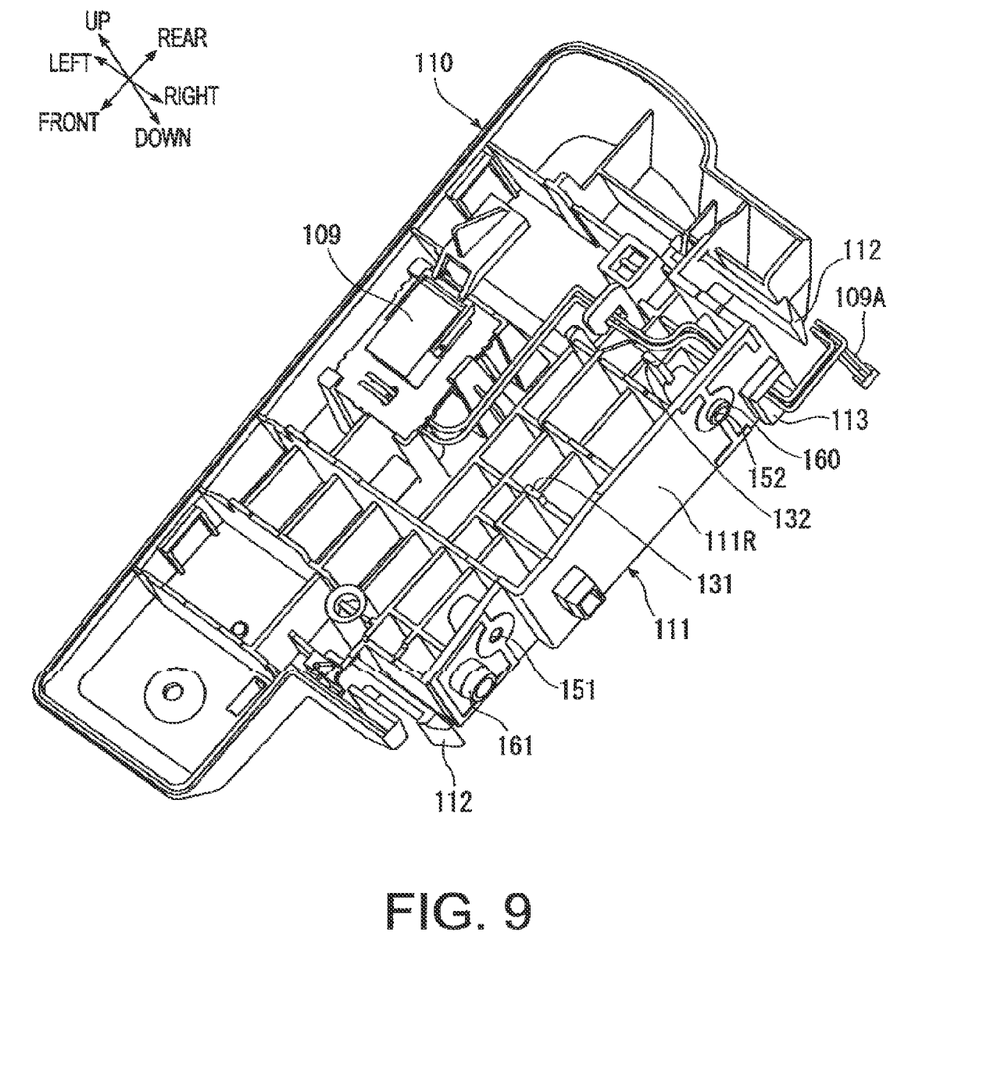
FIG. 9 is a perspective view showing a holder main body included in the holder of the communication device in the embodiment according to one or more aspects of the present invention.

As shown in FIGS. 6, 8, and 9, the holder main body 110 is substantially box-shaped member formed from injection-molded thermoplastic resin. An upper face side of the holder main body 110 is open. There are reinforcing ribs formed in a grid pattern inside the holder main body 110. As shown in FIGS. 2 and 6, a substantially horizontal lower surface of the holder main body 110 forms a lower surface 100B of the holder 100. The holder 100 includes a plurality of antiskid projections 119 formed in a ridge pattern to protrude downward from the lower surface 100B.

In the embodiment, the lower surface 100 B of the holder 100 serves as a finger-holding portion at the side of the first side cover 210 as well. Namely, when the user lifts the communication device 1 by the both hands, the user is allowed to put one hand on the lower surface 100B of the holder 100.

When the user utilizes the lower surface 100 B of the holder 100 as the finger-holding portion at the side of the first side cover 210, the antiskid projections 119 prevents the user's hand from slipping on the lower surface 100B. As shown in FIG. 1, a height from a bottom face of the communication device main body 2 to the lower surface 100B is defined as "H1." Meanwhile, as shown in FIG. 3, the second side cover 220 includes a finger-holding portion 221 configured such that the user is allowed to put the other hand thereon when the user lifts the communication device 1 by the both hands. A height H2 from the bottom face of the communication device main body 2 to the finger-holding portion 221 is substantially identical to the height H1.

Figure 7:
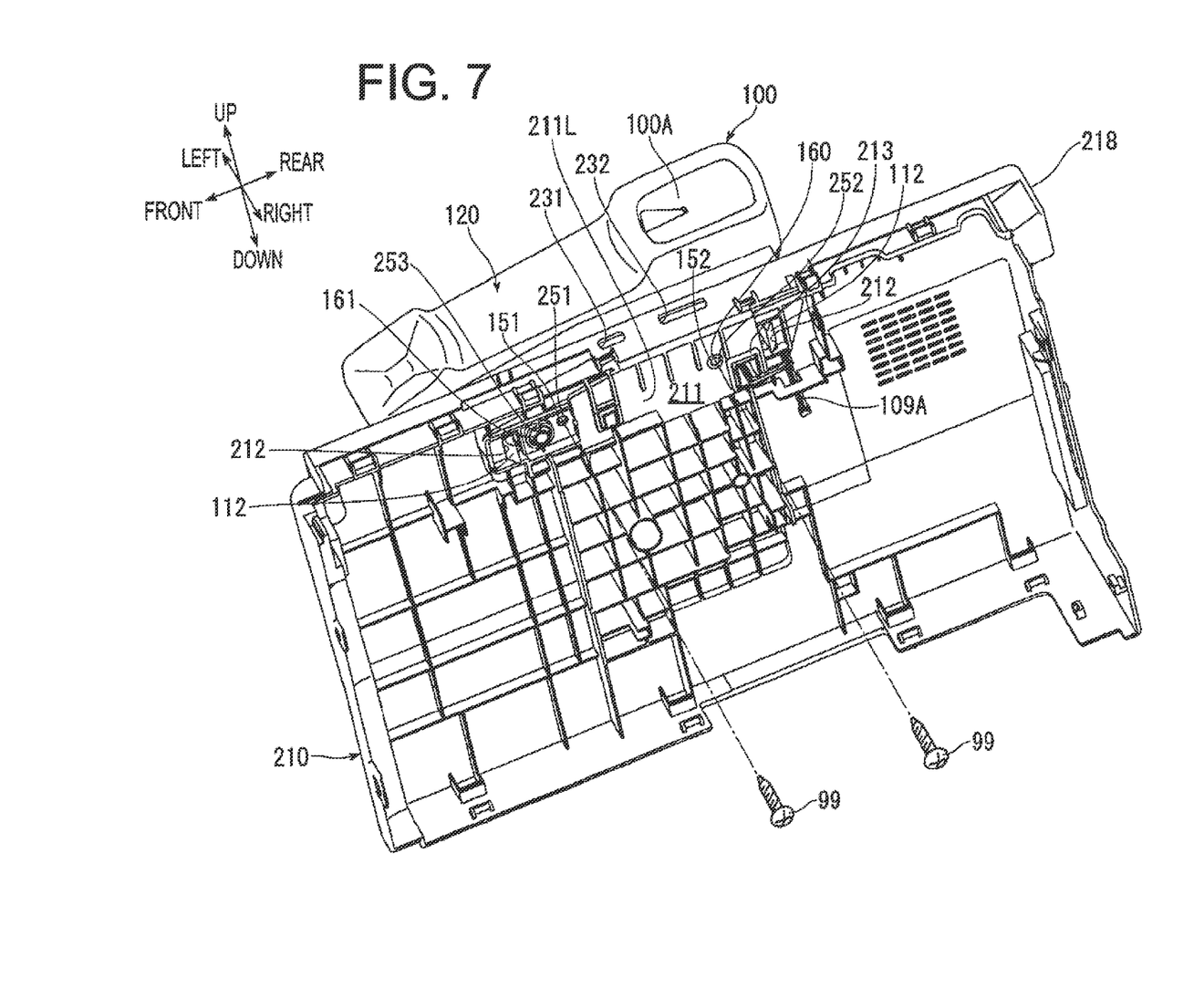
FIG. 7 is a perspective view showing the holder and the first side cover of the communication device in the embodiment according to one or more aspects of the present invention.

As shown in FIGS. 6 to 8, the holder upper body 120 is formed from injection-molded thermoplastic resin. An upper surface of the holder upper body 120 is formed along the shape of the handset 50 and defined as an upper surface 100A of the holder 100. The handset 50, which is placed on the upper surface 100A, is held by the holder 100.

<Structure for Attaching the Holder to the First Side Cover>

As shown in FIGS. 6 and 9, the holder main body 110 includes an insertion portion 111 that protrudes rightward. As shown in FIG. 9, a right wall 111R of the insertion portion 111 is formed substantially in a rectangular shape elongated in the front-to-rear direction when viewed along the left-to-right direction.

The insertion portion 111 includes two click projections 112 that are formed to protrude rightward and face each other across the right wall 111R in the front-to-rear direction.

Figure 10:
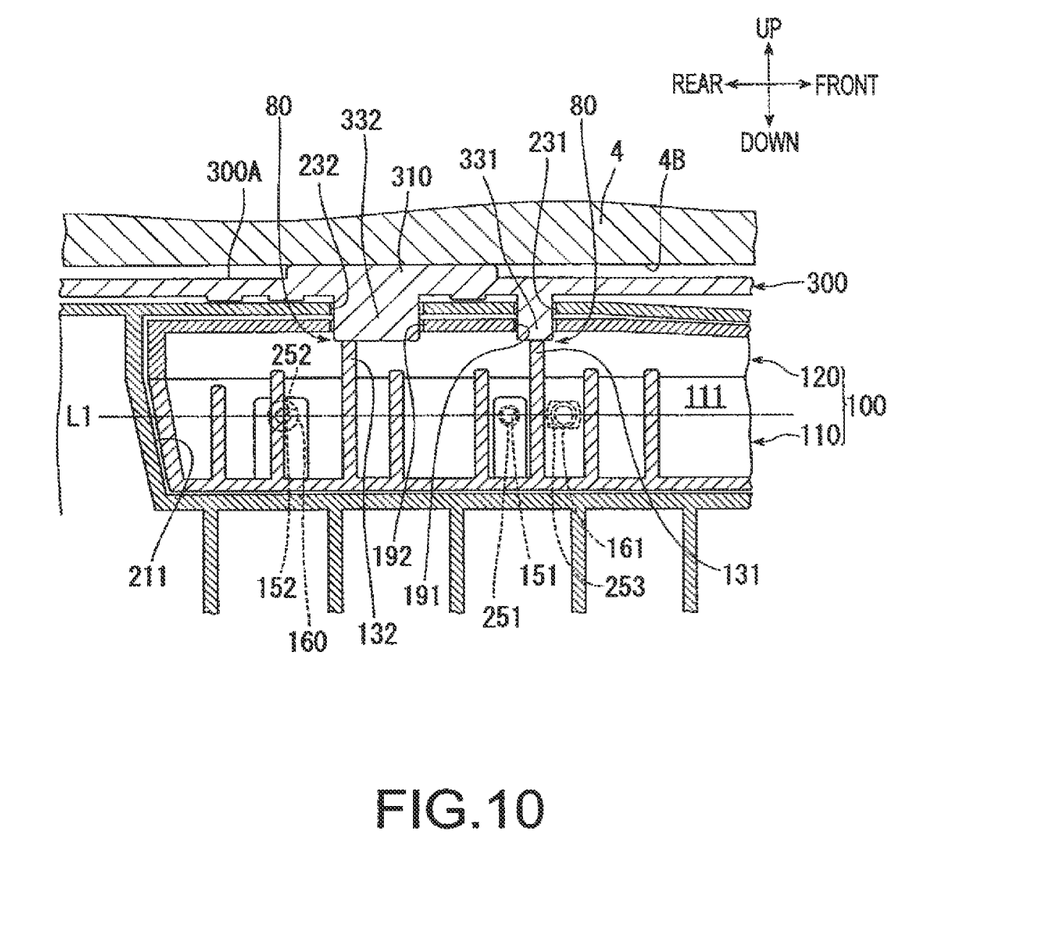
FIG. 10 is an enlarged cross-sectional side view showing a relative relationship among the holder, the first side cover, the upper cover, and the reading unit of the communication device in the embodiment according to one or more aspects of the present invention.

At a front side and a rear side of the right wall 111R, two screw holes 151 and 152 are formed to be recessed leftward (toward the handset 50 set on the holder 100), respectively. As shown in FIG. 10, the screw holes 151 and 152 are disposed substantially at the same height in the vertical direction. As shown in FIGS. 6 and 9, a positioning boss 160 is formed around the rear screw hole 152. The positioning boss 160 protrudes rightward (toward the communication device main body 2) in a cylindrical shape coaxial with the screw hole 152. Further, a positioning boss 161 is formed in front of the front screw hole 151. The positioning boss 161 also protrudes rightward (toward the communication device main body 2) in a cylindrical shape in the same manner as the positioning boss 160. It is noted that, in the embodiment, the screw holes 151 and 152 and the positioning bosses 160 and 161 form a male joint unit.

As shown in FIGS. 6, 9, and 10, reinforcing ribs are formed in a grid pattern inside the insertion portion 111. At upper ends of the reinforcing ribs, two load-transmitting portions 131 and 132 are formed and arranged along the front-to-rear direction. The load-transmitting portions 131 and 132 are formed to protrude upward.

As shown in FIG. 9, a wiring guide hole 113 is formed in a position obliquely lower than the screw hole 152. The wiring guide hole 113 has a protruding rim formed therearound that protrudes rightward in a rectangular tube shape. Electrical wires 109A of a switch 109 for detecting the handset 50 placed on the holder 100 run through the wiring guide hole 113.

As shown in FIG. 8, the holder upper body 120 includes a plate-shaped insertion portion 121 that protrudes rightward substantially in a plate shape. The plate-shaped insertion portion 121 is formed in the same shape as the insertion portion 111 of the holder main body 110 when viewed from the top (along the vertical direction). At a right side of the plate-shaped insertion portion 121, two through holes 191 and 192 are formed and arranged along the front-to-rear direction. As shown in FIG. 10, the through holes 191 and 192 are located above the load-transmitting portions 131 and 132 of the insertion portion 111, respectively.

As shown in FIGS. 1, 2, 6-8, and 10, the first side cover 210 includes a recessed portion 211 that is recessed rightward (toward the inside of the communication device main body 2). Further, the recessed portion 211 is formed in a shape corresponding to the insertion portion 111 and the plate-shaped insertion portion 121 stacked in the vertical direction. As shown in FIG. 7, the first side cover 210 includes two rectangular through holes 212 formed to face each other across the recessed portion 211 in the front-to-rear direction.

As shown in FIGS. 6 and 7, there are three through holes 251, 252, and 253 formed at a front side and a rear side of an inner wall 211L of the recessed portion 211. Specifically, the through holes 25 land 253 are formed at the front side of the inner wall 211L, and the through hole 252 is formed at the rear side of the inner wall 211L. As shown in FIG. 10, the through holes 251, 252, and 253 are provided substantially at the same height in the vertical direction. As shown in FIG. 6, the rear through hole 252 has an inner diameter adapted such that the positioning boss 160 of the holder main body 110 is tightly fitted into the rear through hole 252. As shown in FIGS. 7 and 10, the most anterior through hole 253 is formed in an oval shape elongated in the front-to-rear direction, such that the positioning boss 161 of the holder main body 110 is fitted thereinto with little clearance in the vertical direction. It is noted that, in the embodiment, the through holes 251, 252, and 253 form a female joint unit. As shown in FIG. 7, the inner wall 211L includes a rectangular hole 213 that is formed in a position obliquely lower than the through hole 252 such that the protruding rim of the wiring guide hole 113 is inserted thereinto.

As shown in FIGS. 1, 2, 6, and 8, the first side cover 210 includes a receiving section 219 that is formed below the recessed portion 211 so as to protrude leftward in a trapezoidal shape. An upper surface of the receiving section 219 and a lower surface of the recessed portion 211 are coincident with the same plane.

s shown in FIG. 8, before the first side cover 210 is fixed to the frame member (not shown) of the communication device main body 2, the insertion portion 111 and the plate-shaped insertion portion 121 of the holder 100 are inserted into the recessed portion 211. Thereby, as shown in FIG. 6, the right wall 111R of the insertion portion 111 stops in contact with the inner wall 211L of the recessed portion 211, so as to secure a small gap between the recessed portion 211 and the insertion portions 111 and 121 in both the vertical direction and the left-to-right direction. At this time, as the positioning boss 160 is tightly fitted into the rear through hole 252, the holder 100 is positioned relative to the recessed portion 211. Further, some relative movement in the front-to-rear direction between is allowed the positioning boss 161 and the most anterior through hole 253 (the oval-shaped hole). This makes it easy to position the holder 100 relative to the first side cover 210 with the positioning bosses 160 and 161. Moreover, as shown in FIG. 7, the click projections 112 and the rectangular holes 212 are latched together so as to prevent the insertion portion 111 or the plate-shaped insertion portion 121 from being pulled out of the recessed portion 211. In addition, the protruding rim of the wiring guide hole 113 is inserted into the rectangular hole 213 with some clearance. Thereby, it is possible to let the electrical wires 109A run from the holder 100 into the communication device main body 2.

Then, by driving two screws 99 into the screw holes 151 and 152 via the through holes 251 and 252, respectively, from the inside of the first side cover 210, the male joint unit of the holder 100 is joined with the female joint unit of the first side cover 210. In this state, as shown in FIG. 10, the positioning bosses 160 and 161, the screw holes 151 and 152 are provided on a straight line L1 that extends in the front-to-rear direction (which is the longitudinal direction of the holder 100) along the left-side wall surface of the first side cover 210. Furthermore, as shown in FIG. 6, the receiving section 219 faces the lower surface of the insertion portion 111 across a small gap.

As shown in FIG. 7, the first side cover 210 includes, at the upper end thereof, two through holes 231 and 232 arranged in the front-to-rear direction. As shown in FIG. 10, when the male joint unit is joined with the female joint unit, the through hole 231 is above the through hole 191 and the load-transmitting portion 131, and the through hole 232 is above the through hole 192 and the load-transmitting portion 132. Further, as shown in FIG. 6, the load-transmitting portions 131 and 132 are on the left side of the male joint unit (which includes the screw holes 151 and 152 and the positioning bosses 160 and 161) in the width direction of the communication device 1.

As shown in FIG. 8, the upper cover 300 includes, on a left-side lower surface thereof, two load-receiving portions 331 and 332 arranged in the front-to-rear direction. The load-receiving portions 331 and 332 are ribs extending downward.

As shown in FIGS. 6 and 10, when the left end of the upper cover 300 is joined with the upper end of the first side cover 210, the load-receiving portions 331 and 332 are inserted from above into the through holes 231 and 232 and the through holes 191 and 192. At this time, the lower ends of the load-receiving portions 331 and 332 are in contact with the load-transmitting portions 131 and 132 of the holder main body 110, respectively. It is noted that, in the embodiment, the load-transmitting portions 131 and 132 and the load-receiving portions 331 and 332 form a load transmission unit 80 that transmits to the upper cover 300 a load F1 (see FIG. 6) that is applied upward from the lower side of the holder 100.

As shown in FIG. 8, a projection 310 is formed at a left end of the upper surface 300A of the upper cover 300. The projection 310 protrudes upward in a wedge shape. When the reading unit main body 4 is in the contact position (see FIG. 5A), the projection 310 contacts the lower surface 4B of the reading unit main body 4, as shown in FIGS. 6 and 10.

<Operations and Advantages>

According to the communication device 1 of the embodiment, the lower surface 100B of the holder 100 serves as a finger-holding portion provided at the side of the first side cover 210. Further, the lower surface 100B of the holder 100 and the finger-holding portion 221 of the second side cover 220 forms a pair of finger-holding portions. Therefore, when the user puts his/her hands on the lower surface 100B and the finger-holding portion 221 to lift the communication device 1 with both hands, the upward load F1 is applied to the lower surface 100B of the holder 100, as shown in FIG. 6.

The communication device 1 is provided with the load transmission unit 80 that includes the load-transmitting portions 131 and 132 and the load-receiving portions 331 and 332. Therefore, even though the upward load F1 is applied to urge the holder 100 to rotate upward around the screw holes 151 and 152, the positioning bosses 160 and 161, and the through holes 251, 252, and 253, the load-transmitting portions 131 and 132 stop in contact with the load-receiving portions 331 and 332. Thus, the upward load F1 is transmitted to the upper cover 300 via the load-receiving portions 331 and 332.

Meanwhile, between the holder 100 and the recessed portion 211, there is not any transmission pathway of the upward load F1 other than the screw holes 151 and 152, the positioning bosses 160 and 161, the through holes 251, 252, and 253, the load-transmitting portions 131 and 132, and the load-receiving portions 331 and 332. Thus, the upward load F1 is less likely to be transmitted to the first side cover 210.

Further, the upper cover 300, which has a higher stiffness than the first side cover 210, certainly bears the transmitted load F1. Therefore, it is possible to certainly prevent the holder 100 from rotating upward around the screw holes 151 and 152 and the positioning bosses 160 and 161 in response to the upward load F1. Consequently, the recessed portion 211 of the first side cover 210, the insertion portion 111 of the holder 100, and the neighboring regions are less likely to be deformed. Thus, it is possible to certainly prevent the first side cover 210 or the holder 100 from being damaged.

Hence, according to the communication device 1 of the embodiment, it is possible to certainly improve the mechanical durability of the structure for attaching the holder 100 that holds the handset 50. Further, since the user is allowed to safely use the lower surface 100B of the holder 100 as a finger-holding portion, the user is allowed to easily transport the communication device 1.

Particularly, the load-receiving portions 331 and 332 are configured as ribs extending down toward the load-transmitting portions 131 and 132, respectively. Further, the first side cover 210 includes the through holes 231 and 232 into which the load-receiving portions 331 and 332 are inserted, respectively. Thereby, the upward load F1 applied to the holder 100 is certainly transmitted to the upper cover 300, but much less likely to be transmitted to the first side cover 210.

Suppose that the positioning bosses 160 and 161 and the screw holes 151 and 152 are not provided on the straight line L1 which extends in the longitudinal direction of the holder 100 along the side wall surface of the first side cover 210. More specifically, suppose that instead of the positioning boss 160 formed coaxially with the screw hole 152, a positioning section which is displaced from the screw holes 151 and 152 in the vertical direction is adopted. In such a case, when the user puts his/her hand on the lower surface 100B of the holder 100 to lift the communication device 1, friction and backlash are likely to be caused between the positioning section and the recessed portion 211. Consequently, abnormal sound might occur. In this regard, according to the embodiment, as shown in FIG. 10, the positioning bosses 160 and 161 and the screw holes 151 and 152 are provided on the straight line L1. Therefore, friction and backlash are less likely to be caused between the positioning section and the recessed portion 211. Thus, abnormal sound is less likely to occur.

Further, since the communication device 1 includes the reading unit 3, the total weight of the communication device 1 is heavier than that of a device having no reading unit. Therefore, when the user puts his/her hand on the lower surface 100B of the holder 100 to lift the communication device 1, the high load F1 is applied upward from the lower surface 100B of the holder 100. However, according to the communication device 1 of the embodiment, the high upward load F1 applied to the holder 100 is transmitted to the upper cover 300 via the load-transmitting portions 131 and 132 and the load-receiving portions 331 and 332, and further transmitted to the lower surface 4B of the reading unit main body 4 via the projection 310. The reading unit main body 4, which accommodates the reading unit 30, includes the internal frame (not shown). Therefore, the reading unit main body 4 has a high stiffness. Thus, together with the upper cover 300, the reading unit main body 4 certainly bears the load F1 transmitted via the projection 310. Hence, it is possible to certainly prevent the holder 100 from turning upward around the screw holes 151 and 152 and the positioning bosses 160 and 161 in response to the upward load F1. Consequently, even though the total weight of the communication device 1 increases by the weight of the reading unit 3, it is possible to prevent the first side cover 210 or the holder 100 from being damaged. Thus, it is possible to enhance mechanical durability of the communication device 1 as a whole.

Further, as shown in FIGS. 1 and 3, according to the communication device 1 of the embodiment, the height H1 from the bottom face of the communication device main body 2 to the lower surface 100B, which serves as a finger-holding portion at the side of the first side cover 210 when the user lifts the communication device 1 by his/her hands, is substantially identical to the height H2 from the bottom face of the communication device main body 2 to the finger-holding portion 221 at the side of the second side cover 220. Therefore, the user is allowed to easily lift the communication device 1. Further, the first side cover 210 needs not be provided with another finger-holding portion separately from the lower surface 100B of the holder 100. Thus, it is possible to more flexibly choose a position for providing the holder 100.

Further, as shown in FIG. 6, according to the communication device 1 of the embodiment, in the case where the user mistakenly pushes the holder 100 downward when putting the handset 50 on the holder 100, a load F2 is applied downward from the upper surface 100A of the holder 100. In this case, the downward load F2 is applied to the holder 100 so as to urge the holder 100 to rotate downward around the screw holes 151 and 152 and the positioning bosses 160 and 161. Even in this case, the lower surface of the insertion portion 111 stops in contact with the upper surface of the receiving section 219, and the receiving section receives and bears the downward load F2. Therefore, it is possible to prevent the holder 100 from turning downward around the screw holes 151 and 152 and the positioning bosses 160 and 161 in response to the downward load F2. Consequently, the recessed portion 211 of the first side cover 210, the insertion portion 111 of the holder 100, and the neighboring regions are less likely to be deformed. Thus, it is possible to certainly prevent the first side cover 210 or the holder 100 from being damaged.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

(Modifications)

The load-transmitting portions 131 and 132 may be planes. Further, the load-transmitting portions 131 and 132 may be ribs extending long upward, and the load-receiving portions 331 and 332 may be planes or projections that protrude short downward.

Further, the positioning boss 160 coaxial with the screw hole 152 may be relocated in another position on the straight line L1. Even in this case, friction and backlash are less likely to be caused between the male joint unit and the female joint unit, and thus abnormal sound is less likely to occur.

Instead of the antiskid projections 119, a concave-convex surface or a number of projections may be formed on the lower surface 100B of the holder 100. Alternatively, for example, an antiskid material such as a rubber plate may be attached onto the lower surface 100B of the holder 100.

What is claimed is:

1. A communication device comprising:
   a communication unit configured to perform data communication;
   a communication device main body that accommodates the communication unit;
   a handset electrically connected with the communication unit, the handset being configured to be used for voice communication;
   a first side cover configured to form a first side wall of the communication device main body in a predetermined width direction of the communication device main body;
   an upper cover disposed over the first side cover, the upper cover being configured with a higher stiffness than the first side cover;
   a holder attached to the first side cover, the holder being configured to hold the handset on an upper surface of the holder; and
   a load transmission unit configured to transmit, to the upper cover, a load applied upward from a lower surface of the holder.

2. The communication device according to claim 1,
   wherein the holder comprises:
      a first joint unit configured to be connected with the first side cover; and
      a load-transmitting portion configured to contact the upper cover,
   wherein the first side cover comprises a second joint unit configured to be connected with the first joint unit by a fastening member,
   wherein the upper cover comprises a load-receiving portion configured to contact the load-transmitting portion, and
   wherein the load transmission unit is formed with the load-transmitting portion and the load-receiving portion.

3. The communication device according to claim 2,
   wherein the load-transmitting portion is disposed outside the first joint unit in the predetermined width direction.

4. The communication device according to claim 3,
   wherein at least one of the load-transmitting portion and the load-receiving portion is a rib that extends toward a different one of the load-transmitting portion and the load-receiving portion along a vertical direction, and
   wherein the first side cover comprises a through hole through which the rib is inserted.

5. The communication device according to claim 2,
   wherein the first joint unit comprises:
      a positioning unit configured to position the holder relative to the first side cover; and
      a fastened portion configured to be joined with the fastening member, and
   wherein the positioning unit and the fastened portion are disposed on a linear line that extends in a longitudinal direction of the holder along a side wall surface of the first side cover.

6. The communication device according to claim 1, further comprising:
   a reading unit configured to read an image of a document sheet; and
   a reading unit main body disposed over the upper cover, the reading unit main body accommodating the reading unit, the reading unit main body being configured to move between a contact position where the reading unit main body contacts the upper cover and a separate position where the reading unit main body is above and separate from the upper cover,
   wherein the upper cover comprises a projection formed on an upper surface thereof, the projection being configured to contact a lower surface of the reading unit main body in the contact position and transmit the load to the reading unit main body.

7. The communication device according to claim 1,
   wherein the holder comprises an antiskid portion provided on the lower surface thereof.

8. The communication device according to claim 1, further comprising a second side cover that faces the first side cover and forms a second side wall of the communication device main body in the predetermined width direction of the communication device main body,
   wherein the second side cover comprises a finger-holding portion formed in a position as high as the lower surface of the holder.

9. The communication device according to claim 1,
   wherein the first side cover comprises a receiving section configured to contact the lower surface of the holder and receive and bear a load applied downward from an upper surface of the holder.

* * * * *